(12) United States Patent
Kuroda et al.

(10) Patent No.: US 10,343,712 B2
(45) Date of Patent: Jul. 9, 2019

(54) ELECTRIC POWER STEERING SYSTEM

(71) Applicant: DENSO CORPORATION, Kariya, Aichi-pref. (JP)

(72) Inventors: Yoshihide Kuroda, Kariya (JP); Haruo Suzuki, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 133 days.

(21) Appl. No.: 15/660,732

(22) Filed: Jul. 26, 2017

(65) Prior Publication Data

US 2018/0029635 A1 Feb. 1, 2018

(30) Foreign Application Priority Data

Jul. 27, 2016 (JP) .................................. 2016-147228

(51) Int. Cl.
*B62D 5/04* (2006.01)
*B62D 3/12* (2006.01)

(52) U.S. Cl.
CPC ............. *B62D 5/0463* (2013.01); *B62D 3/12* (2013.01); *B62D 5/046* (2013.01); *B62D 5/0496* (2013.01)

(58) Field of Classification Search
CPC ........ B62D 5/0463; B62D 3/12; B62D 5/046; B62D 5/0496
See application file for complete search history.

(56) References Cited

U.S. PATENT DOCUMENTS

| | | | |
|---|---|---|---|
| 6,448,731 B1* | 9/2002 | Miller .................... | B62D 5/046 318/488 |
| 7,589,940 B2* | 9/2009 | Sawano ................ | B62D 5/046 361/155 |
| 7,791,296 B2* | 9/2010 | Ogawa .................... | B62D 5/04 318/434 |
| 8,253,362 B2* | 8/2012 | Sakamoto ........... | B62D 5/0481 318/434 |

(Continued)

FOREIGN PATENT DOCUMENTS

| | | |
|---|---|---|
| JP | 2000-198457 | 7/2000 |
| JP | 2005-067414 | 3/2005 |

(Continued)

*Primary Examiner* — Kevin Hurley
*Assistant Examiner* — Michael R Stabley
(74) *Attorney, Agent, or Firm* — Knobbe, Martens, Olson & Bear, LLP

(57) ABSTRACT

In an electric power steering system, a motor outputs, based on an AC voltage controlled by switching elements using a power-supply voltage from a power source, assist torque for assisting a driver's turning effort of a steering member. A voltage monitor monitors the power-supply voltage, and a determiner determines whether the power-supply voltage is lower than an assistive voltage. The assistive voltage is defined as a voltage that enables the motor to output the assist torque. A temperature detector detects a temperature of each switching element. A motor control unit determines whether the temperature of each switching element is lower than a heat-resistant temperature of the corresponding switching element. The motor control unit controls a motor current when it is determined that the power-supply voltage is lower than the assistive voltage, and the temperature of at least one switching element is lower than the heat-resistant temperature.

7 Claims, 9 Drawing Sheets

(56) References Cited

U.S. PATENT DOCUMENTS

| | | | |
|---|---|---|---|
| 8,989,965 B2* | 3/2015 | Abe | B62D 5/0481 |
| | | | 701/36 |
| 2005/0269151 A1 | 12/2005 | Miyaura | |
| 2010/0044146 A1 | 2/2010 | Kasai et al. | |
| 2011/0231064 A1 | 9/2011 | Abe et al. | |
| 2013/0307448 A1 | 11/2013 | Ikemoto et al. | |
| 2016/0052541 A1* | 2/2016 | Nakayama | B62D 5/0463 |
| | | | 701/41 |

FOREIGN PATENT DOCUMENTS

| | | |
|---|---|---|
| JP | 2005-193751 | 7/2005 |
| JP | 2007-290429 | 11/2007 |
| JP | 2008-179247 | 8/2008 |
| JP | 2009-113676 | 5/2009 |
| JP | 2009-292427 | 12/2009 |
| JP | 2013-159289 A | 8/2013 |

* cited by examiner

ELECTRIC POWER STEERING SYSTEM

CROSS REFERENCE TO RELATED APPLICATIONS

This application is based on and claims the benefit of priority from Japanese Patent Application 2016-147228 filed on Jul. 27, 2016, the disclosure of which is incorporated in its entirety herein by reference.

TECHNICAL FIELD

The present disclosure relates to electric power steering systems.

BACKGROUND

Electric power steering systems are known as in-vehicle systems installed in vehicles. Such an electric power steering system is operative to assist a driver's turning effort of a steering wheel using torque generated by a motor. For example, Japanese Patent Application Publication 2013-159289, referred to as a published patent document, discloses an example of these electric power steering systems. The electric power steering system disclosed in the published patent document includes an inverter comprised of three pairs of high- and low-side field-effect transistors (FETs) for controlling driving of a motor, such as a three-phase alternating-current (AC) motor.

Such an electric power steering system installed in a vehicle shares a battery serving as its power source with other external components. For example, if the electric power steering system and a starter share a battery serving as their power source, the voltage across the battery may rapidly decrease due to cranking of an internal combustion engine by the starter.

From this viewpoint, the electric power steering system disclosed in the published patent document includes three pairs of Zener diodes. The first pair of Zener diodes is connected between the gate and source of the first high-side FET, and the second pair of Zener diodes is connected between the gate and source of the second high-side FET. Additionally, the third pair of Zener diodes is connected between the gate and source of the third high-side FET.

Specifically, a decrease in the voltage across the battery may result in a difference in potential between the voltage across the battery and the source voltage of each high-side FET. At that time, each pair of Zener diodes is configured to protect the gate of a corresponding one of the high-side FETs even if the source-gate voltage of the corresponding high-side FET increases.

SUMMARY

Recent vehicles commonly include an idle reduction and restart function. The idle reduction and restart function installed in a vehicle stops an internal combustion engine, referred to as an engine, while the vehicle is stopped. When an engine restart condition is satisfied, the idle reduction and restart function causes a starter to turn a crankshaft of the engine, thus cranking the engine.

As described above, an electric power steering system installed in the vehicle shares the battery with the starter. Cranking of the engine using the starter may result in the voltage across the battery decreasing below a minimum voltage value required to drive the motor of the electric power steering system for assisting the driver's steering of the steering wheel.

This may result in the motor's assist of the driver's steering effort of the steering wheel being stopped. This may result in the occurrence of kickback, which represents road shocks being transferred to the steering wheel, and/or the occurrence of noise, resulting in the driver of the vehicle experiencing discomfort.

On the other hand, the lower the gate voltage of a usual FET is, the higher the on resistance of the FET is. The higher the on resistance of a usual FET is, the higher power loss through the FET is. The higher power loss may cause a higher temperature of the FET due to heating of the FET.

In view of these circumstances, the electric power steering system disclosed in the published patent document limits the duty cycle of each of the FETs using the temperature of the Zener diodes as a parameter if the voltage across the battery decreases. Although the electric power steering system disclosed in the published patent document can protect the Zener diodes connected to the respective high-side FETs, the electric power steering system disclosed in the published patent document cannot protect the FETs themselves without providing the Zener diodes. A malfunction in at least one of the FETs may result in the driver of the vehicle experiencing the previously-mentioned discomfort.

In view of the circumstances, a first aspect of the present disclosure seeks to provide electric power steering systems, each of which is capable of addressing the problems set forth above.

Specifically, a second aspect of the present disclosure seeks to provide such electric power steering systems, each of which is capable of properly assisting a driver's turning effort of a steering wheel, ith a simpler structure, while protecting switching elements even if a voltage across a power source decreases.

According to an exemplary aspect of the present disclosure, there is provided an electric power steering system. The system includes a motor adapted to output, based on an alternating-current voltage controlled by switching elements in accordance with a power-supply voltage from a power source, assist torque for assisting a driver's turning of a steering member of a vehicle. The system includes a voltage monitor configured to monitor the power-supply voltage, and a determiner configured to determine whether the power-supply voltage monitored by the voltage monitor is lower than an assistive voltage. The assistive voltage is defined as a voltage that enables the motor to output the assist torque. The system includes a temperature detector configured to detect a temperature of each of the switching elements, and a motor control unit. The motor control unit is configured to determine whether the temperature of each of the switching elements is lower than a predetermined heat-resistant temperature of the corresponding one of the switching elements. The motor control unit is also configured to control a motor current that flows, based on the alternating-current voltage, in the motor when it is determined that 1. A first condition that the power-supply voltage monitored by the voltage monitor is lower than the assistive voltage is satisfied 2. A second condition that the temperature of at least one of the switching elements is lower than the predetermined heat-resistant temperature is satisfied Controlling, i.e. changing, the motor current when the first and second conditions are satisfied enables the at least one of the switching elements itself to be protected while continuously assisting the driver's steering effort of the steering wheel. This therefore achieves an advantageous effect of preventing the occurrence of kickback and/or the occurrence of noise due to the assisting operation stopping, to prevent discomfort from being caused to a driver of the vehicle.

BRIEF DESCRIPTION OF THE DRAWINGS

Other aspects of the present disclosure will become apparent from the following description of embodiments with reference to the accompanying drawings in which.

DETAILED DESCRIPTION OF EMBODIMENT

The following describes a preferred embodiment of the present disclosure with reference to the accompanying drawings.

The following describes the preferred embodiment of the present disclosure with reference to FIGS. 1 to 9.

Figure 1:
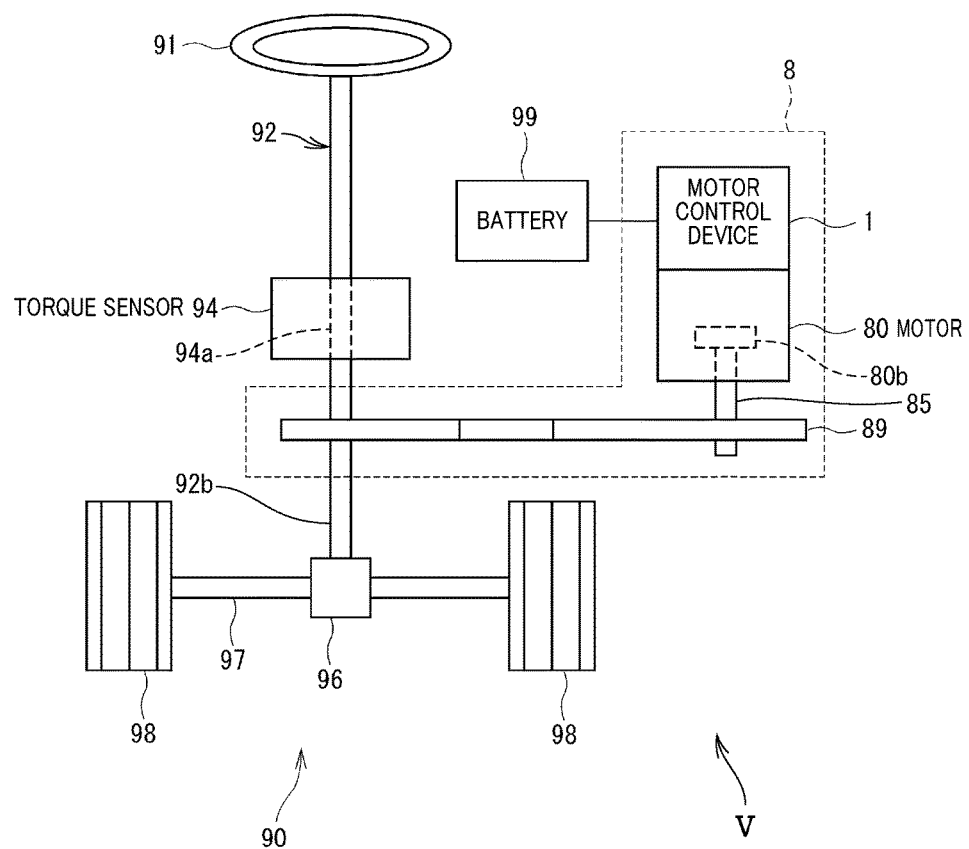
FIG. 1 is a structural diagram schematically illustrating an electric power steering system according to a preferred embodiment of the present disclosure.

Referring to FIG. 1, an electric power steering system 8 according to the preferred embodiment is installed in, for example, a steering system 90; the steering system 90 is installed in a vehicle V. The electric power steering system 8 is operative to assist a driver's steering operation of a steering wheel 91 of the vehicle V.

The steering system 90 includes, for example, the steering wheel 91 as a driver's operation member, a steering shaft 92, a torque sensor 94, a pinion gear 96, a rack and axle 97, wheels 98, a battery serving as, for example, a power source 99, and the electric power steering system 8.

The steering shaft 92 is comprised of, for example, a first portion, i.e. an upper portion, 92a and a second portion, i.e. a lower portion, 92b. Each of the first and second portions 92a and 92b of the steering shaft 92 also has opposing first and second ends.

The steering wheel 91 is connected to the first end of the first portion 92a of the steering shaft 92. The torque sensor 94 is mounted to the steering shaft 92; the torque sensor 94 is operative to measure torque based on a driver's steering operation of the steering shaft 92 as steering torque, and output a measurement signal indicative of the measured torque. The torque sensor 94 includes a torsion bar 94a having opposing first and second ends. The second end of the first portion 92a of the steering shaft 92 is coaxially connected to the first end of the torsion bar 94a, and the second end of the torsion bar 94a is coaxially connected to the first end of the second portion 92b of the steering shaft 92. The pinion gear 96 is mounted to the second end of the second portion 92b of the steering shaft 92.

The torque sensor 94 measures the twist of the torsion bar 94a based on a driver's steering operation of the steering shaft 92 as steering torque.

The rack and axle 97 includes a rod-shaped rack with which the pinion gear 96 is engaged. The rack and axle 97 also includes tie rods each having opposing first and second ends. The first end of each of the tie rods is coupled to a corresponding one of both ends of the rod-shaped rack. One of the wheels 98 is mounted to the second end of a corresponding one of the tie rods, and the other of the wheels 98 is also mounted to the second end of a corresponding one of the tie rods.

Driver's turning of the steering wheel 91 causes the steering shaft 92 coupled to the steering wheel 91 to turn. This rotary motion, i.e. torque, of the steering shaft 92 is transformed to linear motion of the rack of the rack and axle 97. This linear motion of the rack of the rack and axle 97 causes the wheels 98 to steer via the respective tie rods. The steering angle of each of the wheels 98 is determined based on the axial displacement of the rack of the rack and axle 97.

The battery 99 has a terminal voltage, i.e. an output direct-current (DC) voltage in volts [V]. The terminal voltage of the battery 99 will be referred to as a power-supply voltage.

Figure 2:
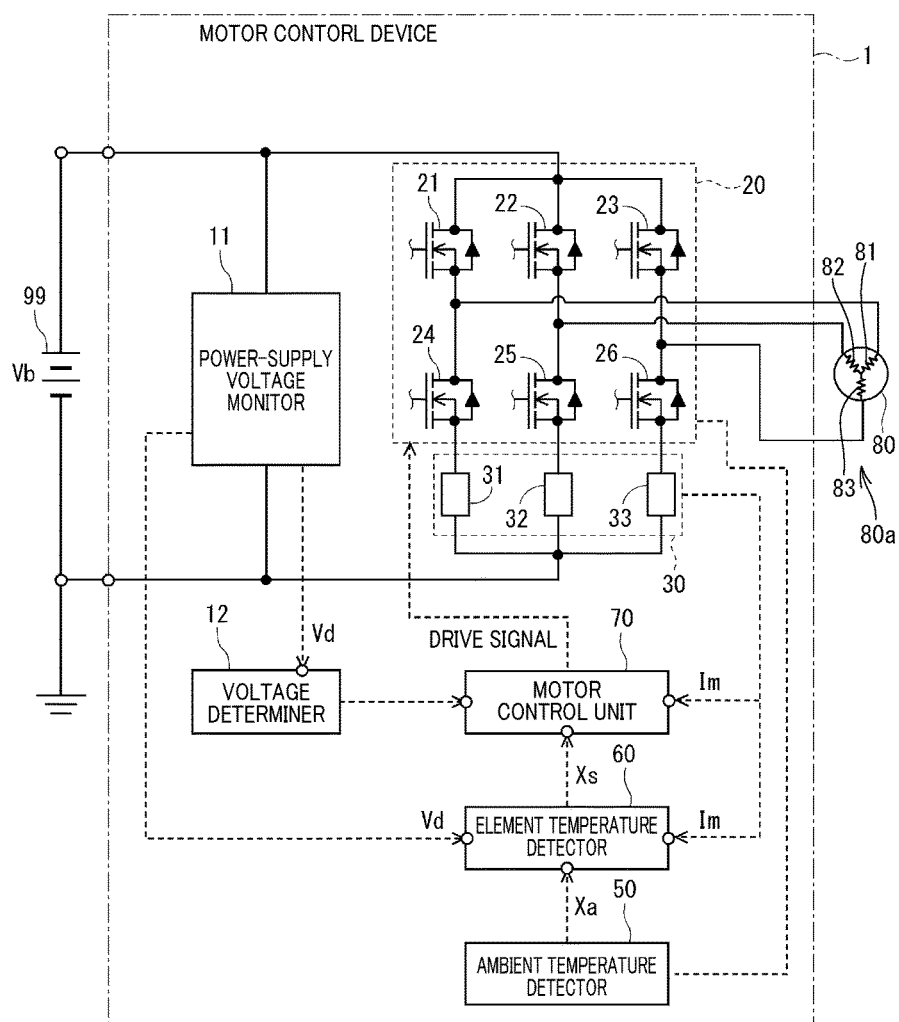
FIG. 2 is a circuit diagram schematically illustrating an example of the overall circuit structure of a motor control device illustrated in FIG. 1.

Referring to FIGS. 1 and 2, the electric power steering system 8 includes, for example, a motor 80 with a shaft 85, a deceleration gear mechanism 89 serving as, for example, a power transfer mechanism, and a motor control device 1. In FIG. 2, the shaft 85, the deceleration gear mechanism 89 and torque sensor 94 are omitted from illustration.

The deceleration gear mechanism 89 includes, for example, a first gear coupled to the shaft 85 of the motor 80, and a second gear engaged with the first gear and mounted to the steering shaft 92. For example, the deceleration gear mechanism 89 is operative to transfer assist torque generated based on the turning of the shaft 85 of the motor 80 to the steering shaft 92 while decelerating the rotational speed of the motor 80, i.e. increasing the assist torque generated by the motor 80 by a predetermined gear ratio between the first gear and the second gear. The motor 80 is driven based on the power-supply voltage Vb supplied from the battery 99 to generate assist torque Ta that turns the first gear in a predetermined forward direction or a predetermined reverse direction opposite to the forward direction.

Specifically, the electric power steering system 8 is configured such that the motor control device 1 causes the motor 80 to generate assist torque Ta based on steering torque measured by the torque sensor 94 and/or vehicle operating condition signals. The vehicle operating condition signals, which include, for example, the speed of the vehicle V, represent the operating conditions of the vehicle V, and are sent from another controller via an in-vehicle network, such as an unillustrated controller area network (CAN). Note that a value of the power supply voltage Vb of the battery 99, which enables the motor 80 to output assist torque Ta, will be referred to as an assistive voltage Va [V]. The assistive voltage Va is previously set as a threshold value.

Next, the following describes an example of the electrical configuration of the electric power steering system 8 with reference to FIG. 2.

Referring to FIGS. 1 and 2, the motor 80 is designed as, for example, a three-phase brushless motor comprised of, for example, a stator 80a, a rotor 80b, the shaft 85, and an unillustrated magnetic field member, such as permanent magnets, a field coil, and the like. The stator 80a includes, for example, an unillustrated stator core, and three-phase coils, i.e. U, V, and W-phase coils, 81, 82, and 83. The rotor 80b, to which the shaft 85 is mounted, is configured to be rotatable relative to the stator core together with the shaft 85. The three-phase coils 81, 82, and 83 are wound in, for example, slots of the stator core and around the stator core. The magnetic field member is mounted to the rotor 80b for generating a magnetic field. That is, the motor 80 is capable of rotating the rotor 80b based on magnetic interactions between the magnetic field generated by the magnetic field member of the rotor 80b and a rotating magnetic field generated by the three-phase coils 81, 82, and 83.

Note that currents flowing through the respective U, V, and W-phase coils 81, 82, and 83 will be referred to as phase currents Iu, Iv, and Iw.

The shaft 85 has opposing first and second ends in its axial direction. For example, the first end of the shaft 85 is located to face the motor control device 1. The second end of the shaft 85 serves as an output terminal coupled to the deceleration gear 89 (see FIG. 1). This enables torque generated based on rotation of the rotor assembly, which is comprised of the rotor 80b and the shaft 85, to be transferred to the steering shaft 92 via the deceleration gear 89.

As illustrated in FIG. 2, the motor control device 1 includes a power-supply voltage monitor 11, a voltage determiner 12, an inverter 20, a current measuring unit 30, an ambient temperature detector 50, an element temperature detector 60, and a motor control unit 70.

The power-supply voltage monitor 11 is connected to the battery 99, and is operative to monitor the power supply voltage Vb. The voltage monitored by the power-supply voltage monitor 11 will be referred to as a monitored voltage Vd [V]. The power-supply voltage monitor 11 is also operative to output, to the voltage determiner 12 and the element temperature detector 60, the monitored voltage Vd.

The voltage determiner 12 is connected to the power-supply voltage monitor 11, and operative to compare the monitored voltage Vd with the assistive voltage Va.

Specifically, the voltage determiner 12 is operative to determine, based on the comparison result, whether the monitored voltage Vd is lower than the assistive voltage Va, which is expressed as the equation Vd<Va. Then, the voltage determiner 12 outputs, to the motor control unit 70, the determination result of whether the monitored voltage Vd is lower than the assistive voltage Va.

The inverter 20, which is connected to the battery 99, is operative to receive DC power, i.e. a DC voltage, supplied from the battery 99, and convert the DC power into alternating-current (AC) power, i.e. an alternating-current voltage. Then, the inverter 20 is operative to apply the AC power to the three-phase coils 81, 82, and 83.

The inverter unit 20 is comprised of six switching elements 21 to 26 connected in bridge configuration. The switching elements 21 to 26 can be mounted to a common circuit board.

Specifically, the switching elements 21 and 24 are a pair of U-phase upper- and lower-arm switches connected in series to each other, and the switching elements 22 and 25 are a pair of V-phase upper- and lower-arm switches connected in series to each other. Additionally, the switching elements 23 and 26 are a pair of W-phase upper- and lower-arm switches connected in series to each other.

The switching elements 21 to 26 are for example semiconductor switches, such as metal-oxide-semiconductor field-effect transistors (MOSFETs). The preferred embodiment uses MOSFETs as the respective switching elements 21 to 26, but can use other types of switches, such as insulated-gate bipolar transistors (IGBTs) or thyristors, in place of the MOSFETs. That is, one or more of various types of switches, such as MOSFETs or IGBTs, can be used for each of switching elements 21 to 26.

If the MOSFETs are used as the switching elements 21 to 26, the intrinsic diode of each of the MOSFETs 21 to 26 can serve as a flywheel diode connected in antiparallel to the corresponding one of the MOSFETs 21 to 26. Other flywheel diodes can be connected in antiparallel to the respective switching elements 21 to 26.

That is, the source of each of the upper-arm switching elements 21 to 23 is connected to the drain of the corresponding one of the lower-arm switching elements 24 to 26.

The drains of the switching elements 21 to 23 are commonly connected to the positive terminal of the battery 99.

The connection point between the U-phase upper- and lower-arm switching elements 21 and 24 is connected to a first end of the U-phase coil 81, and the connection point between the V-phase upper- and lower-arm switching elements 22 and 25 is connected to a first end of the V-phase coil 82. Additionally, the connection point between the W-phase upper- and lower-arm switching elements 23 and 26 is connected to a first end of the W-phase coil 83. Second ends of the U, V-, and W-phase coils 81, 82, and 83, which are opposite to the first ends, are connected to a common junction, i.e. a neutral point, in, for example, a star-configuration.

The current measuring unit 30 includes current sensor elements 31, 32, and 33.

The sources of the switching elements 24 to 26 are respectively connected to first ends of respective current sensor elements 31 to 33. Second ends of the current sensors 31 to 33, which are opposite to their first ends, are connected to the negative terminal of the battery 99 via a common signal ground. For example, each of the current sensing elements 31 to 33 is comprised of a shunt resistor.

The current sensor element 31, which is referred to as a U-phase current sensor element 31, is operative to output, to the element temperature detector 60 and motor control unit 70, a U-phase current parameter, such as a voltage thereacross, indicative of the U-phase current Iu flowing through the U-phase coil 81.

The current sensor element 32, which is referred to as a V-phase current sensor element 32, is operative to output, to the element temperature detector 60 and motor control unit 70, a V-phase current parameter, such as a voltage thereacross, indicative of the V-phase current Iv flowing through the V-phase coil 82.

The current sensor element 33, which is referred to as a W-phase current sensor element 33, is operative to output, to the element temperature detector 60 and motor control unit 70, a W-phase current parameter, such as a voltage thereacross, indicative of the W-phase current Iv flowing through the W-phase coil 83.

Note that the U-, V-, and W-phase currents Iu, Iv, and Iw flowing through the respective coils 81, 82, and 83 will be referred to motor currents Im in amperes [A].

The ambient temperature detector 50 includes, for example, a thermistor, as an example of temperature-sensitive elements, such as a ceramic semiconductor, having a variable electrical resistance thereof. The ambient temperature detector 50 is operative to detect ambient temperature around the vehicle V. For example, the ambient temperature detector 50 measures, as element ambient temperature Xa [° C.], the temperature of the atmosphere around the switching elements 21 to 26, such as the atmosphere around the circuit board to which the switching elements 21 to 26 are mounted. Then, the ambient temperature detector 50 outputs the element ambient temperature Xa to the element temperature detector 60.

The element temperature detector 60 is capable of detecting the temperature of each switching element 21 to 26 as an element temperature Xs [° C.].

Because it is difficult to directly measure the element temperature Xs of each switching element 21 to 26, the element temperature detector 60 calculates the element temperature Xs of each switching element 21 to 26 as a function of the corresponding phase motor current Im, the monitored voltage Vd, and the element temperature Xs.

Then, the element temperature detector 60 outputs the element temperature Xs of each switching element 21 to 26 to the motor control unit 70.

Figure 3:
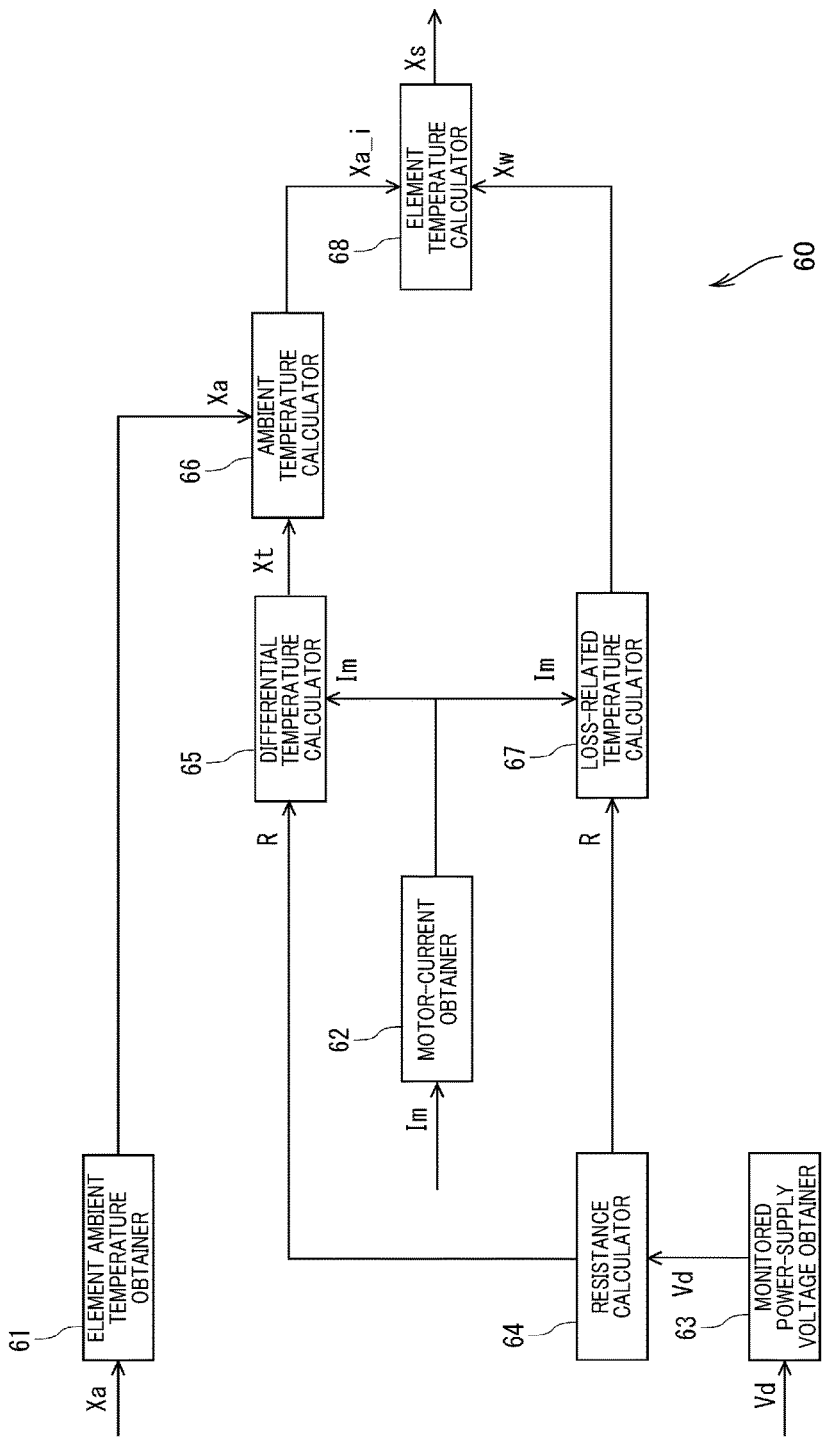
FIG. 3 is a block diagram schematically illustrating functional modules of an element temperature detector illustrated in FIG. 2.

In particular, the element temperature detector 60 is specially configured to calculate the element temperature Xs of each switching element 21 to 26 as illustrated in FIG. 3.

Specifically, the element temperature detector 60 includes an element ambient temperature obtainer 61, a motor-current obtainer 62, a monitored power-supply voltage obtainer 63, a resistance calculator 64, a differential temperature calculator 65, an ambient temperature integrator 66, a loss-related temperature calculator 67, and an element temperature calculator 68.

The element ambient temperature obtainer 61 obtains, from the ambient temperature detector 50, the element ambient temperature Xa of each switching element 21 to 26, and outputs the element ambient temperature Xa of each switching element 21 to 26 to the ambient temperature integrator 66.

The motor-current obtainer 62 obtains, from the current measuring unit 30, the motor currents Im, and outputs, to the differential temperature calculator 65 and loss-related temperature calculator 67, the motor currents Im.

The monitored power-supply voltage obtainer 63 obtains, from the power-supply voltage monitor 11, the monitored voltage Vd, and outputs, to the resistance calculator 64, the monitored voltage Vd.

Note that a resistance across each switching element 21 to 26 being in an on state based on the monitored voltage Vd will be referred to as an on resistance R in megohm [MΩ].

Figure 4:
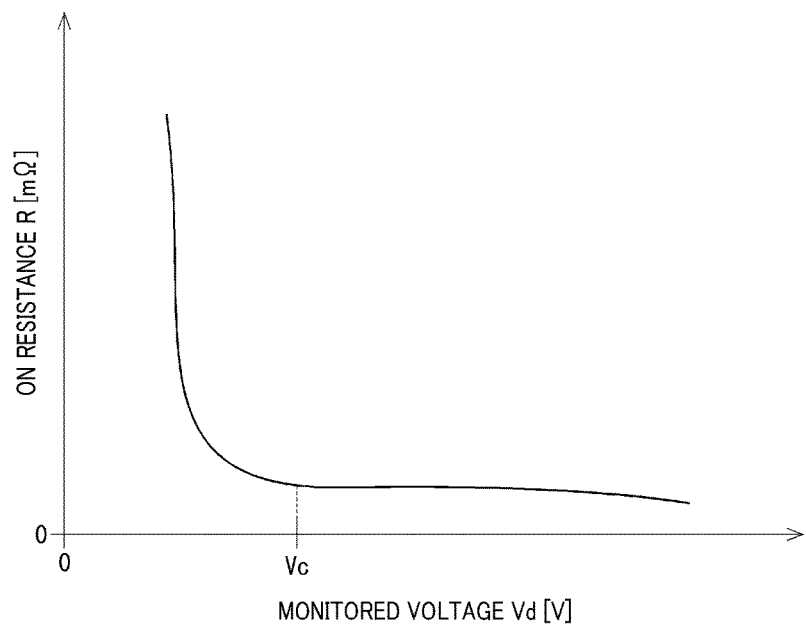
FIG. 4 is a graph schematically illustrating voltage-resistance information indicative of the relationship between a monitored voltage and an on resistance.

The resistance calculator 64 has voltage-resistance information I1 as a function indicative of the relationship between the monitored voltage Vd and the on resistance R, or graphic data indicative of the relationship between the monitored voltage Vd and the on resistance R (see FIG. 4). Then, the resistance calculator 64 calculates, based on the voltage-resistance information I1, the on resistance R corresponding to a present value of the monitored voltage Vd.

For example, as illustrated in FIG. 4, the on resistance R rapidly increases as the monitored voltage Vd, has been a value equal to or lower than a predetermined threshold voltage Vc, decreases. The voltage-resistance information I of each switching element 21 to 26 can be determined depending on the characteristics of the corresponding switching element.

The resistance calculator 64 outputs, to the differential temperature calculator 65 and loss-related temperature calculator 67, the calculated on resistance R.

The differential temperature calculator 65 cyclically executes a calculation task to calculate a differential temperature Xt for each switching element 21 to 26 as a function of the corresponding phase motor current Im and the corresponding on resistance R. Then, the differential temperature calculator 65 repeatedly outputs the differential temperature Xt for each switching element 21 to 26 to the ambient temperature integrator 66. Note that the execution cycle that the differential temperature calculator 65 currently executes will be referred to as a current execution cycle, so that the previously last execution cycle is referred to as an execution cycle that the differential temperature calculator 65 executed one cycle before the current execution cycle.

The differential temperature Xt for each switching element 21 to 26, which is used for calculating the element temperature Xs of the corresponding switching element, represents a temperature increase or a temperature decrease of the corresponding switching element. For example, the differential temperature Xt for each switching element 21 to 26 is represented by the following equation [1]:

$$Xt = (Xt\_pre + Im^2 \times R \times k1)/N \qquad [1]$$

Where:

Xt_pre, which is referred to as an immediately previous differential temperature, represents the differential temperature calculated in the immediately precious execution cycle Im represents the corresponding phase motor current R represents the on resistance of the corresponding switching element k1, which has a unit of [° C./W], represents a first temperature conversion coefficient for converting power loss caused from each switching element 21 to 26 into a temperature change N is a predetermined natural number The immediately previous differential temperature Xt_pre has a unit of [° C.]. If the current execution cycle is the first execution cycle, the immediately previous differential temperature Xt_pre is set to a value of zero or thereabout. That is, when the immediately previous differential temperature Xt_pre is set to the value of zero, the value can contain a certain amount of errors with respect to zero acceptable by skilled persons in the art. Hereinafter, when any parameter is set to zero, the parameter can contain a certain amount of error with respect to zero.

The first temperature conversion coefficient k1 for each switching element 21 to 26 can be determined depending on the characteristics of the corresponding switching element and/or the usage environment.

The ambient temperature integrator 66 integrates the differential temperatures Xt for the respective switching elements 21 to 26 on the element ambient temperature Xa to calculate an integrated ambient temperature Xa_i. Then, the ambient temperature integrator 66 outputs the integrated ambient temperature Xa_i to the element temperature calculator 68.

Note that the temperature change, which will be referred to as a loss-related temperature change Xw [° C.], has been caused from each switching element 21 to 26 due to heating of the corresponding switching element; the heating of each switching element 21 to 26 is due to its power loss. The power loss from each switching element 21 to 26 is generated based on the corresponding phase motor current Im and the corresponding on resistance R.

The loss-related temperature calculator 67 cyclically executes a calculation task to cyclically calculate the loss-related temperature change Xw in accordance with, for example, the following relational equation [2]:

$$Xw = Xw\_pre + Im^2 \times R \times k2 \quad [2]$$

Where:

Xw_pre, which is referred to as an immediately previous loss-related temperature change, represents the loss-related temperature change calculated by the immediately precious execution cycle Im represents the corresponding phase motor current R represents the on resistance of the corresponding switching element k2, which has a unit of [° C./W], represents a second temperature conversion coefficient for converting power loss caused from each switching element 21 to 26 into a temperature change N is a predetermined natural number The immediately previous differential temperature Xt_pre has a unit of [° C.]. If the current execution cycle is the first execution cycle, the immediately previous differential temperature Xt_pre is set to a value of zero or thereabout. That is, when the immediately previous differential temperature Xt_pre is set to the value of zero, the value can contain a certain amount of error with respect to zero considerable by skilled persons in the art. Hereinafter, when any parameter is set to zero, the parameter can contain a certain amount of error with respect to zero.

The second temperature conversion coefficient k2 for each switching element 21 to 26 can be determined to be similar to the first temperature conversion coefficient k1.

The loss-related temperature calculator 67 outputs the loss-related temperature change Xw for each switching element 21 to 26 to the element temperature calculator 68.

Then, the element temperature calculator 68 integrates the loss-related temperature change Xw for each switching element 21 to 26 on the integrated ambient temperature Xa_i. This calculates the element temperature Xs of each switching element 21 to 26. Then, the element temperature calculator 68 outputs the element temperature Xs of each switching element 21 to 26 to the motor control unit 70.

The motor control unit 70 is comprised mainly of a microcomputer including, for example, a CPU and a memory unit including a ROM and a RAM. The CPU of the motor control unit 70 for example can run one or more programs, i.e. program instructions, stored in the memory unit, thus implementing various control tasks as software operations. As another example, the CPU of the motor control unit 71 can include a specific hardware electronic circuit to implement the various control tasks as hardware operations.

The motor control unit 70 is configured to calculate, based on the steering torque Ts, the assist torque Ta upon determining that 1. The monitored voltage Vd is equal to or lower than the assistive voltage Va 2. The element temperature Xs of each switching element 21 to 26 is lower than a predetermined heat-resistant temperature Xr [° C.] for the corresponding switching element On the basis of the calculated assist torque Ta, the control unit 70 controls the inverter 20 to control the motor currents Im such that the motor 80 outputs the assist torque Ta to the steering shaft 92 via the deceleration gear 89.

Note that the heat-resistant temperature Xr for each switching element 21 to 26 represents either the upper limit of a predetermined usable temperature range for the corresponding switching element 21 to 26 or a temperature at which there is a risk of the corresponding switching element being thermally damaged.

In addition, the motor control unit 70 is also configured to limit each of the motor currents Im to a predetermined value in accordance with the element temperature Xs of the corresponding switching element 21 to 26. The predetermined value to which each of the motor currents Im is limited will be referred to as a limited current I_lim [A]. The limited current I_lim for each of the motor currents Im is set to be lower than a predetermined normally usable current range for the corresponding motor current Im.

Figure 5:
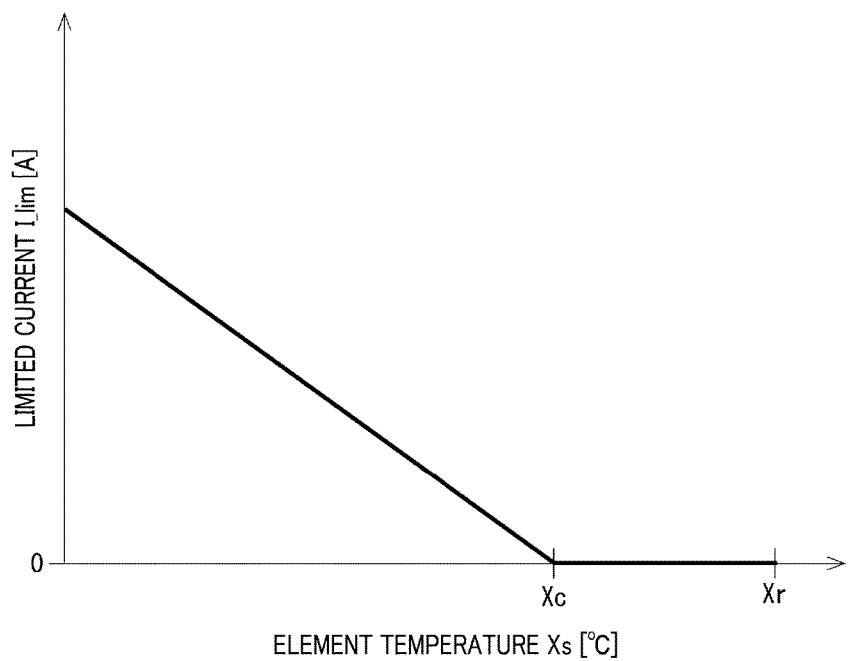
FIG. 5 is a graph schematically illustrating current-temperature information indicative of the relationship between a limited current and an element temperature.

For example, the motor control unit 70 has current-temperature information I2 for each of the motor currents Im as a function, i.e. an m-th order function, or a graph indicative of the relationship between the corresponding limited current I_lim and the corresponding element temperature Xs (see FIG. 5). Note that m is a natural number.

For example, as illustrated in FIG. 5, the limited current I_lim linearly decreases as the element temperature Xs increases. When the element temperature Xs is equal to or higher than a predetermined temperature Xc, the limited current I_lim becomes zero. The heat-resistant temperature Xr for each switching element 21 to 26 is set to be higher than the temperature Xc as illustrated in FIG. 5.

That is, the motor control unit 70 can calculate, based on the current-temperature information I2 for each of the motor currents Im, a value of the limited current I_lim for the corresponding switching element; the value of the limited current I_lim for each of the motor currents Im corresponds to a preset value of the element temperature Xs of the corresponding switching element 21 to 26 on the current-temperature information I2.

Then, the control unit 70 controls the inverter 20 to limit each of the motor currents Im to the limited current I_lim determined for the corresponding motor current.

Figure 6:
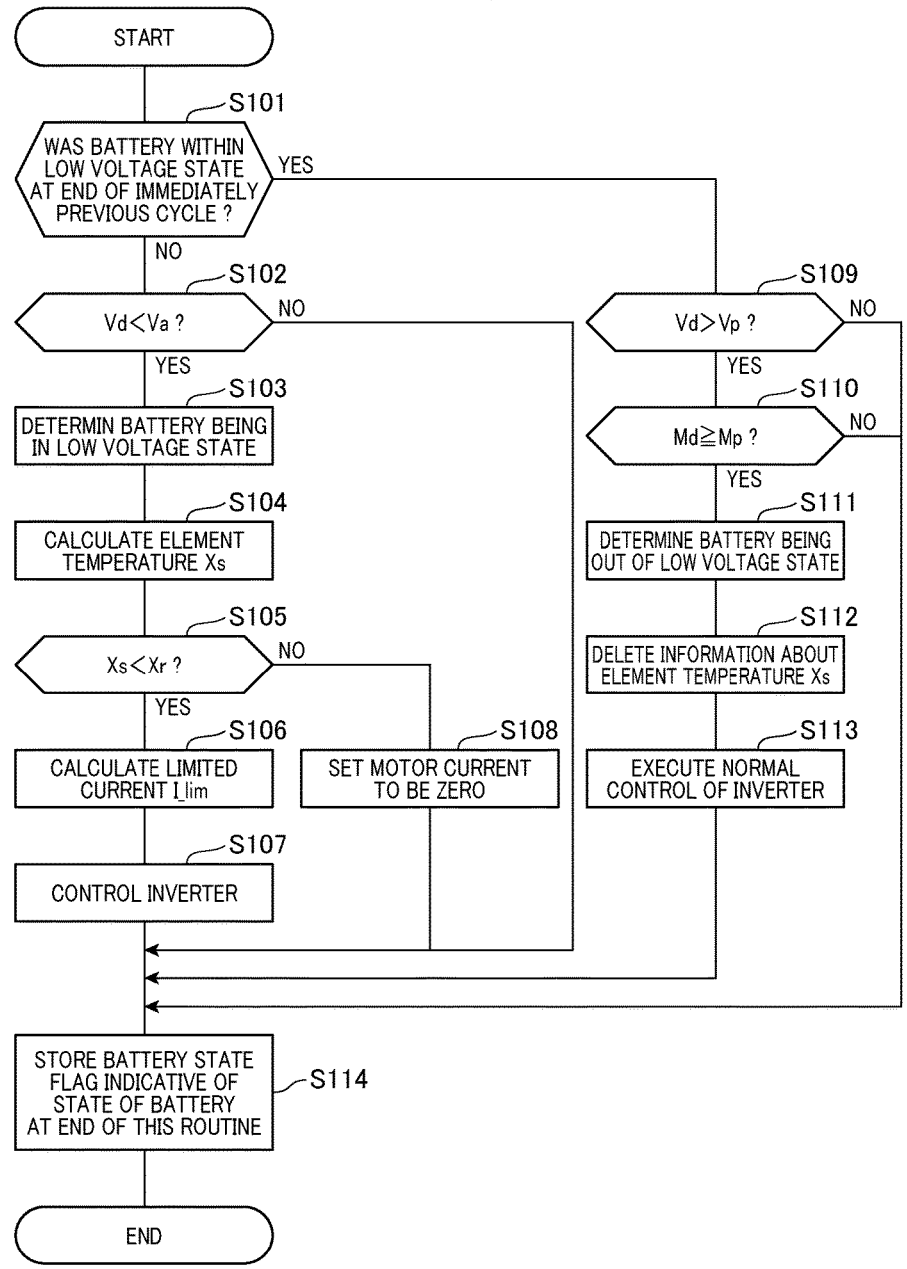
FIG. 6 is a flowchart schematically illustrating a motor control routine carried out by the motor control device.

The following describes a motor control routine carried out by the motor control device 1 in accordance with FIG. 6. Specifically, the motor control device 1 can execute the motor control routine every predetermined period.

When starting a current cycle of the motor control routine, the motor control unit 70 determines whether the power-supply voltage Vb was lower than the assistive voltage Va at the end of the immediately previous cycle of the motor control routine in accordance with a value of a battery state flag stored in the memory unit in step S101. In other words, the motor control unit 70 determines whether the battery 99 was in a predetermined low voltage state, which is set to be lower than the assistive voltage Va, at the end of the immediately previous cycle of the motor control routine in accordance with the value of the battery state flag stored therein in step S101.

The battery state flag will be described later.

Note that, when the motor control device 1 executes the motor control routine at the first time, the motor control unit 70 determines that the power-supply voltage Vb has been equal to or higher than the assistive voltage Va, that is, the battery 99 has been out of the low voltage state.

When it is determined that the battery 99 was not in the low voltage state at the end of the immediately previous cycle of the motor control routine (NO in step S101), the motor control routine proceeds to step S102. In contrast, when it is determined that the battery 99 was in the low voltage state at the end of the immediately previous cycle of the motor control routine (YES in step S101), the motor control routine proceeds to step S109.

In step S102, the voltage determiner 12 obtains, from the monitored voltage Vd from the power-supply voltage monitor 11, and determines whether the monitored voltage Vd is lower than the assistive voltage Va, which is expressed as the equation Vd<Va.

Upon determining that the monitored voltage Vd is lower than the assistive voltage Va (YES in step S102), the voltage determiner 12 outputs, to the motor control unit 70, the determination result representing that the monitored voltage Vd is lower than the assistive voltage Va. Then, the motor control routine proceeds to step S103.

Otherwise, upon determining that the monitored voltage Vd is equal to or higher than the assistive voltage Va (NO in step S102), the voltage determiner 12 outputs, to the motor control unit 70, the determination result representing that the monitored voltage Vd is equal to or higher than the assistive voltage Va. Thereafter, the motor control device 1 terminates the motor control routine.

Following the affirmative determination in step S102, the motor control unit 70 determines that the battery 99 is presently in the low voltage state in step S103. Then, in step S104, the motor control unit 70 instructs the element temperature detector 60 to calculate the element temperature Xs of each switching element 21 to 26. In step S104, the element temperature detector 60 calculates the element temperature Xs of each switching element 21 to 26 in accordance with the functions of the modules 61 to 68 illustrated in FIG. 3. Then, in step S104, the element temperature detector 60 outputs, to the motor control unit 70, the element temperature Xs of each switching element 21 to 26. Thereafter, the motor control routine proceeds to step S105.

In step S105, the motor control unit 70 compares the element temperature Xs of each switching element 21 to 26 with the heat-resistant temperature Xr for the corresponding switching element to thereby determine whether the element temperature Xs of each switching element 21 to 26 is lower than the heat-resistant temperature Xr for the corresponding switching element.

When it is determined that the element temperature Xs of each switching element 21 to 26 is lower than the heat-resistant temperature Xr (YES in step S105), the motor control routine proceeds to step S106. Otherwise, when it is determined that the element temperature Xs of each switching element 21 to 26 is equal to or higher than the heat-resistant temperature Xr (NO in step S105), the motor control routine proceeds to step S108.

In step S106, the motor control unit 70 calculates, based on the current-temperature information I2 for each of the motor currents Im, a value of the limited current I_lim for the corresponding switching element; the value of the limited current I_lim for each of the motor currents Im corresponds to a preset value of the element temperature Xs of the corresponding switching element 21 to 26 on the current-temperature information I2. Thereafter, the motor control routine proceeds to step S107.

In step S107, the control unit 70 controls the inverter 20 to limit each of the motor currents Im to the limited current I_lim determined for the corresponding motor current. Thereafter, the motor control routine proceeds to step S114.

Otherwise, following the negative determination in step S105, the motor control unit 70 controls the inverter 20 to set the motor currents Im to be zero, thus forcibly stopping the motor 80 in step S108. Thereafter, the motor control routine proceeds to step S114.

On the other hand, following affirmative determination in step S101, the voltage determiner 12 obtains, from the monitored voltage Vd from the power-supply voltage monitor 11 in step S109. Then, in step S109, the voltage determiner 12 compares the monitored voltage Vd with a predetermined reference voltage Vp, thus determining whether the monitored voltage Vd is higher than the reference voltage Vp based on the result of the comparison.

Note that the reference voltage Vp is set to be equal to or higher than the assistive voltage Va. The reference voltage Vp can be determined beforehand by, for example, experiments and/or simulations.

Upon determining that the monitored voltage Vd is higher than the reference voltage Vp (YES in step S109), the voltage determiner 12 outputs, to the motor control unit 70, the determination result representing that the monitored voltage Vd is higher than the reference voltage Vp. Then, the motor control routine proceeds to step S110. Otherwise, upon determining that the monitored voltage Vd is equal to or lower than the reference voltage Vp (NO in step S109), the voltage determiner 12 outputs, to the motor control unit 70, the determination result representing that the monitored voltage Vd is equal to or lower than the reference voltage Vp. In response to the determination result representing that the monitored voltage Vd is equal to or lower than the reference voltage Vp, the motor control unit 70 resets a time Md described later to zero when the motor control unit 70 has started the counting operation described hereinafter. Thereafter, the motor control routine proceeds to step S114.

In step S110, the motor control unit 70 starts to count the time Md for which the monitored voltage Vd has exceeded the reference voltage Vp since the affirmative determination in step S109. Then, in step S110, the motor control unit 70 compares the counted time Md with a predetermined threshold time Mp to thereby determine whether the time Md is equal to or larger than the threshold time Mp. The threshold time Mp can be determined beforehand by, for example, experiments and/or simulations. For example, the threshold time Mp is set to be within the range from several milliseconds to several tens of milliseconds.

Upon determining that the time Md is smaller equal to or than the threshold time Mp (NO in step S110), the motor control unit 70 performs the operation in step S114 described later while maintaining the counting operation of the time Md.

Otherwise, upon determining that the time Md is larger than the threshold time Mp (YES in step S110), the motor control unit 70 determines that the battery 99 is out of the low voltage state in step S111. Then, the motor control unit 70 resets the element temperature Xs of each switching element 21 to 26 to be zero in step S112, thus deleting information indicative of the element temperature Xs of each switching element 21 to 26. Thereafter, the motor control routine proceeds to step S113.

Figure 7:
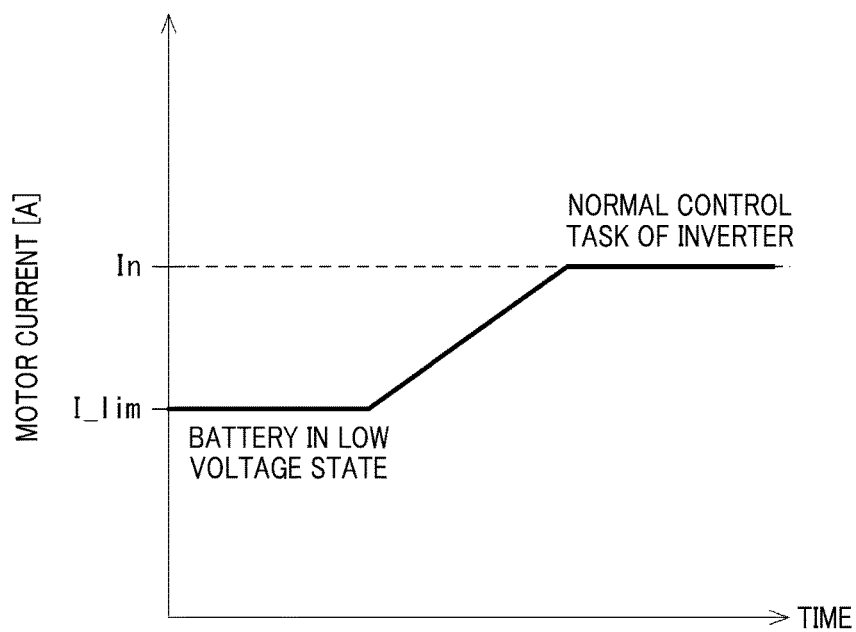
FIG. 7 is a graph schematically illustrating how the motor current changes over time during execution of the motor control routine.

In step S113, the motor control unit 70 executes a normal control task of the inverter 20, which controls the inverter 20 to gradually increase each of the motor currents Im up to a normal current value In within the corresponding normally usable current range as illustrated in FIG. 7. Thereafter, the motor control routine proceeds to step S114.

In step S114, the motor control unit 70 terminates the motor control routine while storing, in the memory unit, the battery state flag representing whether the battery 99 is in the predetermined low voltage state at the end of the motor control routine.

As described above, although the electric power steering system disclosed in the published patent document can protect the Zener diodes connected to the respective high-side FETs, the electric power steering system disclosed in the published patent document cannot protect the FETs themselves without providing the Zener diodes. A malfunction in at least one of the FETs may result in the driver of the vehicle experiencing discomfort.

In contrast, the electric power steering system 8 according to the preferred embodiment is configured to detect the temperature of each switching element 21 to 26 in accordance with 1. The loss-related temperature change Xs that is based on the heating of the corresponding switching element
2. The ambient temperature Xa_i depending on the differential temperature Xt for each switching element 21 to 26, i.e. a temperature increase or a temperature decrease of the corresponding switching element This configuration therefore enables the temperature of each switching element 21 to 26 to be detected with higher accuracy.

In addition, the electric power steering system 8 according to the preferred embodiment is configured to 1. Determine whether the power-supply voltage Vb monitored by the power-supply voltage monitor 11 is equal to or lower than the assistive voltage Va
2. Determine whether the detected temperature of each switching element 21 to 26 is lower than the heat-resistant temperature Xr determined for the corresponding switching element
3. Limit, when it is determined that the detected temperature of at least one switching element is lower than the heat-resistant temperature Xr determined for the corresponding switching element, the corresponding motor current Im to the limited current I_lim that is set to be lower than the predetermined normally usable current range for the corresponding motor current Im This configuration protects the at least one switching element itself while continuously assisting the driver's steering effort of the steering wheel 91. This therefore achieves an additional advantageous effect of preventing the occurrence of kickback and/or the occurrence of noise due to stop of the assisting operation, to prevent causing discomfort to the driver of the vehicle.

Modifications

The present disclosure is not limited to the above described embodiments, and can be variably modified within the scope of the present disclosure.

The electric power steering system 8 according to the preferred embodiment is designed as a shaft assist system for assisting the turning of the steering shaft 92 based on the assist torque generated by the motor 80.

As a modification, the electric power steering system 8 according to the preferred embodiment can be designed as a rack assist system for assisting the axial displacement of the rack of the rack and axle 97 based on the assist torque generated by the motor 80. As another modification, the electric power steering system 8 according to the preferred embodiment can be designed as a rack assist system for assisting the turning of the pinion gear 96 based on the assist torque generated by the motor 80.

Figure 8:
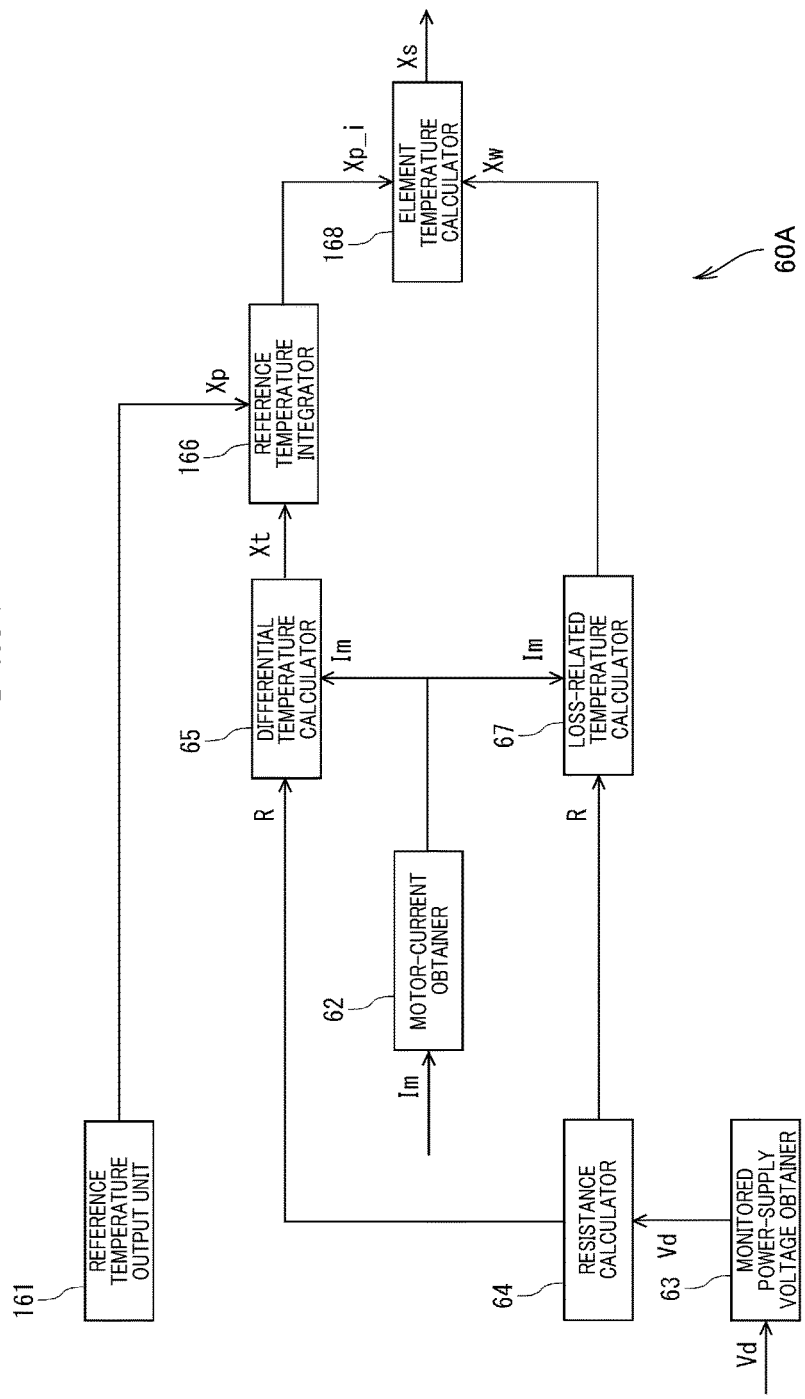
FIG. 8 is a block diagram schematically illustrating functional modules of an element temperature detector according to a first modification of the preferred embodiment.

An element temperature detector 60A according to a first modification of the preferred embodiment is illustrated in FIG. 8. The element temperature detector 60A is configured to calculate the element ambient temperature Xa of each switching element 21 to 26 as a function of a predetermined reference temperature Xp in place of the element ambient temperature Xa of the corresponding switching element. The reference temperature Xp can be determined beforehand by, for example, experiments and/or simulations.

Specifically, as compared with the element temperature detector 60 illustrated in FIG. 3, the element temperature detector 60A includes a reference temperature output unit 161, a reference temperature integrator 166, and an element temperature calculator 168 in place of the respective element ambient temperature obtainer 61, ambient temperature integrator 66, and element temperature calculator 68 (see FIG. 8).

The reference temperature output unit 161 outputs the reference temperature Xp to the reference temperature integrator 166.

The reference temperature integrator 166 integrates the differential temperatures Xt for the respective switching elements 21 to 26 on the reference temperature Xp to calculate an integrated reference temperature Xp_i. Then, the reference temperature integrator 166 outputs the integrated reference temperature Xp_i to the element temperature calculator 168.

The element temperature calculator 168 integrates the loss-related temperature change Xw for each switching element 21 to 26 on the integrated reference temperature Xp_i. This calculates the element temperature Xs of each switching element 21 to 26. Then, the element temperature calculator 168 outputs the element temperature Xs of each switching element 21 to 26 to the motor control unit 70.

This configuration enables the ambient temperature detector 50 to be eliminated from the motor control device 1 including the modified element temperature detector 60A, thus downsizing the motor control device 1 including the modified element temperature detector 60A.

Figure 9:
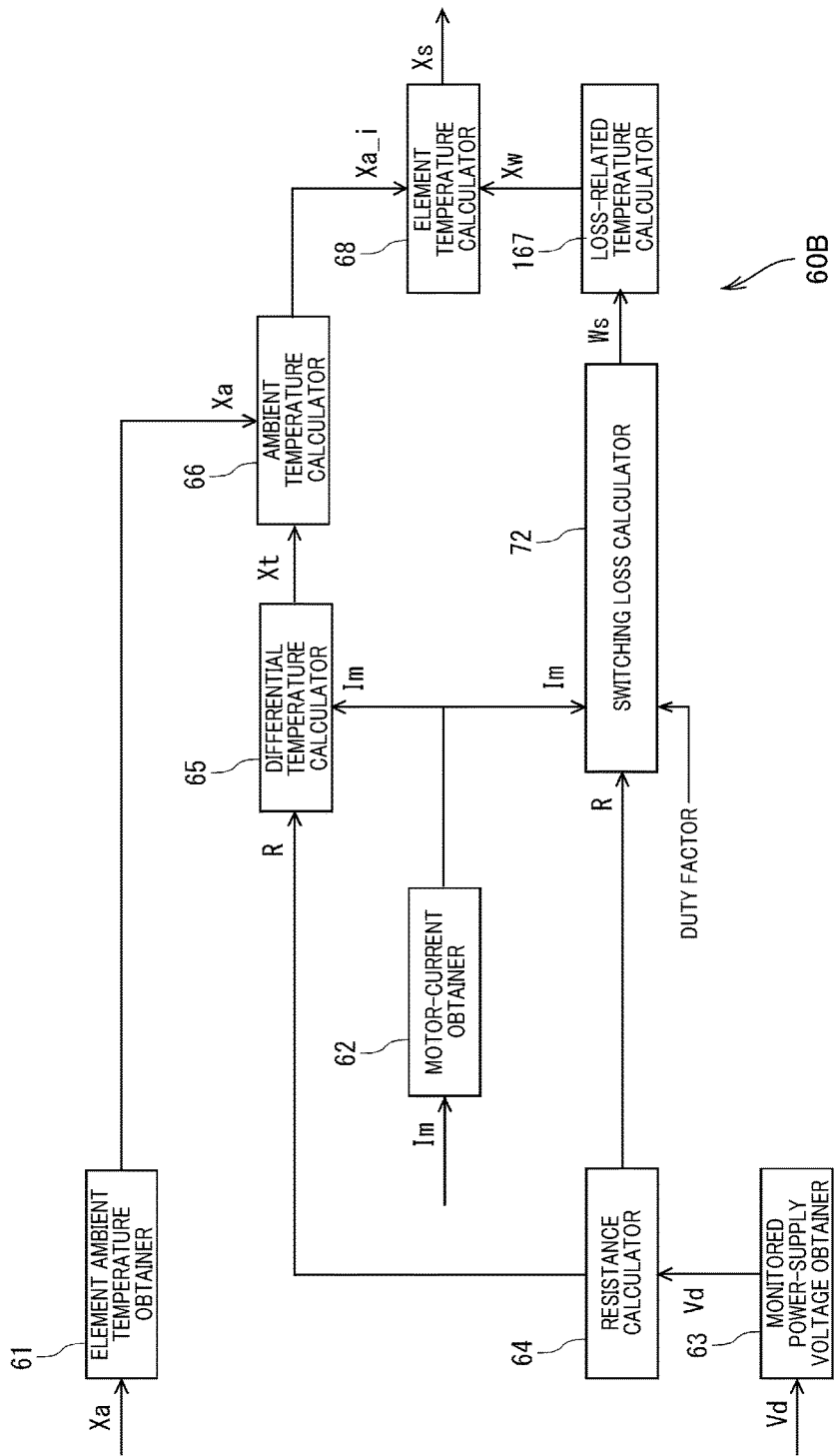
FIG. 9 is a block diagram schematically illustrating functional modules of an element temperature detector according to a second modification of the preferred embodiment.

In addition, an element temperature detector 60B according to a second modification of the preferred embodiment is illustrated in FIG. 9. The element temperature detector 60B includes a switching loss calculator 72 and a loss-related temperature calculator 167 as compared with the structure of the element temperature detector 60 illustrated in FIG. 3.

The switching loss calculator 72 calculates power loss Ws of each switching element 21 to 26 including switching loss and thermal loss caused by on-off switching operations of the corresponding switching element in accordance with the motor currents Im, the on resistance R of the corresponding switching element 21 to 26, and a predetermined duty factor, i.e. a duty ratio, of the corresponding switching element. Then, the switching loss calculator 72 outputs the power loss Ws of each switching element 21 to 26 to the loss-related temperature calculator 167.

The loss-related temperature calculator 167 calculates, based on the power loss Ws of each switching element 21 to 26, loss-related temperature change Xw for the corresponding switching element. Then, the loss-related temperature calculator 167 outputs, to the element temperature calculator 68, the loss-related temperature change Xw for each switching element 21 to 26.

This configuration calculates the loss-related temperature change Xw for each switching element 21 to 26 based on the power loss Ws of the corresponding switching element 21 to 26 including switching loss and thermal loss caused by on-off switching operations of the corresponding switching element. This therefore enables the loss-related temperature change Xw for each switching element 21 to 26 to be calculated with further higher accuracy.

While the illustrative embodiments of the present disclosure have been described herein, the present disclosure is not limited to the embodiments described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. An electric power steering system comprising:
a motor adapted to output, based on an alternating-current voltage controlled by switching elements in accordance with a power-supply voltage from a power source, assist torque for assisting a driver's turning effort of a steering member of a vehicle;
a voltage monitor configured to monitor the power-supply voltage;
a determiner configured to determine whether the power-supply voltage monitored by the voltage monitor is lower than an assistive voltage, the assistive voltage being defined as a voltage that enables the motor to output the assist torque;
a temperature detector configured to detect a temperature of each of the switching elements; and
a motor control unit configured to:
determine whether the temperature of each of the switching elements is lower than a predetermined heat-resistant temperature of the corresponding one of the switching elements; and
control a motor current that flows, based on the alternating-current voltage, in the motor in response to determining that:
the power-supply voltage monitored by the voltage monitor is lower than the assistive voltage; and
the temperature of at least one of the switching elements is lower than the predetermined heat-resistant temperature.

2. The electric power steering system according to claim 1, wherein:
the motor control unit is configured to limit, based on the temperature of the at least one of the switching elements, the motor current.

3. The electric power steering system according to claim 2, wherein:
the motor control unit is configured to limit the motor current to reduce the motor current as the temperature of the at least one of the switching elements increases.

4. The electric power steering system according to claim 1, wherein:
the temperature detector is configured to calculate the temperature of each of the switching elements as a function of the motor current.

5. The electric power steering system according to claim 1, further comprising:
an ambient temperature detector configured to detect an ambient temperature around the switching elements,
wherein the temperature detector is configured to calculate the temperature of each of the switching elements in accordance with one of the ambient temperature around the switching elements and a predetermined reference temperature for the corresponding one of the switching elements, the predetermined reference temperature for each of the switching elements being set to be lower the predetermined heat-resistant temperature of the corresponding one of the switching elements.

6. The electric power steering system according to claim 1, wherein:
the temperature detector is configured to calculate a resistance of the switching element as a function of the power-supply voltage monitored by the voltage monitor.

7. The electric power steering system according to claim 6, wherein:
the temperature detector is configured to:
obtain an ambient temperature around the switching elements;
calculate a differential temperature for each of the switching elements as a function of the motor current and the resistance of the corresponding one of the switching elements, the differential temperature for each of the switching element representing a temperature increase or a temperature decrease of the corresponding switching element;
calculate a loss-related temperature change of each of the switching element, the loss-related temperature change of each of the switching element having been caused from the corresponding one of the switching elements due to heating of the corresponding one of the switching elements, the heating of each of the switching elements being due to power loss thereof;
integrate the differential temperature for each of the switching element on the element ambient temperature to calculate an integrated ambient temperature; and
integrate the loss-related temperature change for each of the switching elements on the integrated ambient temperature, thus calculating the element temperature of the corresponding one of the switching elements.

* * * * *